(12) United States Patent
Choi et al.

(10) Patent No.: US 11,870,872 B2
(45) Date of Patent: Jan. 9, 2024

(54) METHOD AND APPARATUS FOR SPLITTING AND STORING PROBALISTIC CONTENT BETWEEN COOPERATIVE NODES

(71) Applicant: KOREA ADVANCED INSTITUTE OF SCIENCE AND TECHNOLOGY, Daejeon (KR)

(72) Inventors: Wan Choi, Daejeon (KR); Dongyeon Ko, Daejeon (KR); Junil Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 88 days.

(21) Appl. No.: 16/842,375

(22) Filed: Apr. 7, 2020

(65) Prior Publication Data

US 2021/0105334 A1    Apr. 8, 2021

(30) Foreign Application Priority Data

Oct. 8, 2019    (KR) .......................... 10-2019-0124249

(51) Int. Cl.
*H04L 67/568*    (2022.01)

(52) U.S. Cl.
CPC .................................. *H04L 67/568* (2022.05)

(58) Field of Classification Search
CPC ............. H04L 67/2842; H04L 67/1097; H04L 67/2828; H04L 47/38; H04L 67/327
See application file for complete search history.

(56) References Cited

U.S. PATENT DOCUMENTS

| | | | | |
|---|---|---|---|---|
| 10,461,421 | B1* | 10/2019 | Tran | H04W 4/027 |
| 2002/0099844 | A1* | 7/2002 | Baumann | H04L 47/125 |
| | | | | 709/232 |
| 2003/0018450 | A1* | 1/2003 | Carley | H04L 41/142 |
| | | | | 702/179 |
| 2004/0031056 | A1* | 2/2004 | Wolff | H04N 21/4622 |
| | | | | 725/110 |

(Continued)

FOREIGN PATENT DOCUMENTS

KR    10-2015-0133437 A    11/2015

OTHER PUBLICATIONS

Wang, Wei, Lan, Ruining, Gu, Jingxiong, Huang, Aiping, Shan, Hangguan, Zhang, Zhaoyang, "Edge Caching at Base Stations with Device-to-Device Offloading" Mar. 7, 2017, https://ieeexplore.ieee.org/stamp/stamp.jsp?arnumber=7873264 (Year: 2017).*

(Continued)

*Primary Examiner* — John A Follansbee
*Assistant Examiner* — Raqiul A Choudhury
(74) *Attorney, Agent, or Firm* — Burns & Levinson, LLP; Joseph M. Maraia (57) ABSTRACT

Disclosed are an electronic device and an operating method thereof. The electronic device and operating method are configured to detect the number for splitting one piece of content and allowing a plurality of edge nodes to split and store at least some of packets split from the content based on the number. Detecting the number may be performed based on an average amount of storage of the edge nodes for the content.

6 Claims, 4 Drawing Sheets

(56) References Cited

U.S. PATENT DOCUMENTS

| | | | | |
|---|---|---|---|---|
| 2005/0141463 A1* | 6/2005 | Ando | ............... | H04W 52/267 370/335 |
| 2010/0325656 A1* | 12/2010 | Hardacker | ........... | H04N 21/251 725/31 |
| 2012/0230282 A1* | 9/2012 | Wu | ..................... | H04W 28/16 370/329 |
| 2012/0243589 A1* | 9/2012 | Desjardins | ........... | H04M 11/062 375/222 |
| 2015/0124663 A1* | 5/2015 | Chen | .................... | H04L 1/0023 370/278 |
| 2015/0142914 A1* | 5/2015 | Lau | ....................... | H04B 7/024 709/217 |
| 2015/0208120 A1* | 7/2015 | Yao | ................... | H04N 21/6543 725/9 |
| 2016/0246981 A1* | 8/2016 | Nakagawa | ............. | H04L 9/085 |
| 2016/0254886 A1* | 9/2016 | Bontu | ................... | H04L 5/0073 455/452.1 |
| 2017/0289218 A1* | 10/2017 | Tulino | ................ | H04L 65/4076 |
| 2017/0346881 A1* | 11/2017 | Zhang | .................... | H04L 67/06 |
| 2017/0373974 A1* | 12/2017 | Wood | .................... | H04L 67/327 |
| 2018/0069942 A1* | 3/2018 | Tulino | ................ | H04L 67/2842 |
| 2018/0191631 A1* | 7/2018 | Biederman | ......... | H04L 47/6275 |

OTHER PUBLICATIONS

Avrachenkov, Konstantin, Bai, Xinwei, Goseling, Jasper, "Optimization of Caching Devices with Geometric Constraints;" Jan. 4, 2018, https://hal.inria.fr/hal-01671840/document (Year: 2018).*

* cited by examiner

METHOD AND APPARATUS FOR SPLITTING AND STORING PROBALISTIC CONTENT BETWEEN COOPERATIVE NODES

CROSS REFERENCE TO RELATED APPLICATION

This application is based on and claims priority under 35 U.S.C. 119 to Korean Patent Application No. 10-2019-0124249, filed on Oct. 8, 2019, in the Korean Intellectual Property Office, the disclosure of which is herein incorporated by reference in its entireties.

BACKGROUND OF THE INVENTION

1. Technical Field

Various embodiments relate to an electronic device and an operating method thereof and, more particularly, to a method and apparatus for splitting and storing probabilistic content between cooperative nodes to reduce backhaul traffic usage.

2. Description of the Related Art

Recently, it is necessary to transmit content and processing data having a significant size, such as video streaming or virtual and augmented reality videos, timely and efficiently. According to the reports of the CISCO company released in 2018, it is expected that global IP traffic has reached 156 exabytes monthly, that is, a yearly 1-zettabyte era and will be tripled between the years 2017 and 2022. It is also expected that wireless and mobile devices will occupy 71% of a total of IP traffic in 2022. Accordingly, a mobile edge caching scheme for storing content frequently requested by an edge node, such as a femto or pico base station, among recent radio communication technologies has been in the spotlight as an effective solution for reducing backhaul traffic and a user-felt latency time.

SUMMARY OF THE INVENTION

Various embodiments provide an electronic device for enabling storing packets split from content to be stored in edge nodes based on an optimum number of content splits in order to minimize backhaul traffic and a user-felt latency time, and an operating method thereof.

Various embodiments provides an electronic device for detecting an optimum number of content splits so that an average amount of information of content which may be received by a user equipment from edge nodes approaches a predetermined maximum value, and an operating method thereof.

In an embodiment, an operating method of an electronic device may include detecting the number for splitting one piece of content and allowing a plurality of edge nodes to split and store at least some of packets split from the content based on the number.

In an embodiment, detecting the number may be performed based on an average amount of storage of the edge nodes for the content and the radius of an edge cell area in which the coverage areas of the edge nodes overlap.

In an embodiment, an electronic device includes a communication module and a processor connected to the communication module. The processor may be configured to detect the number for splitting one piece of content and to allow a plurality of edge nodes to split and store at least some of packets split from the content based on the number.

In an embodiment, the number may be detected based on an average amount of storage of the edge nodes for the content and the radius of an edge cell area in which the coverage areas of the edge nodes overlap.

DETAILED DESCRIPTION

Hereinafter, various embodiments of this document are described with reference to the accompanying drawings.

Figure 1:
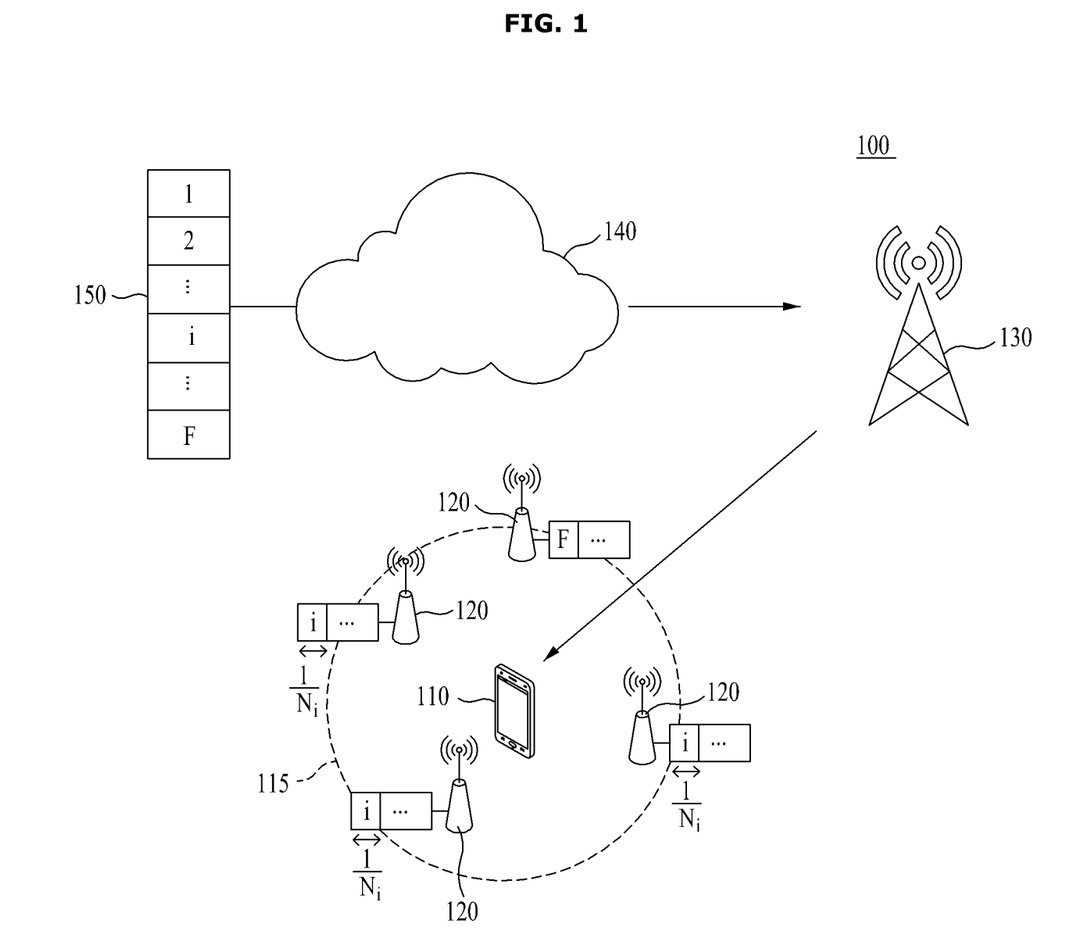
FIG. 1 is a diagram illustrating a communication system according to various embodiments.

FIG. 1 is a diagram illustrating a communication system 100 according to various embodiments.

Referring to FIG. 1, the system 100 according to various embodiments may include a plurality of edge nodes 120 and a macro base station (macro BS) 130 with respect to one user equipment (UE) 110.

The UE 110 may be provided for content use of a user. The UE 110 may play back or output content. The UE 110 may include various forms of devices. For example, the UE 110 may include at least any one of a portable communication device (e.g., smartphone), a computer apparatus, a portable multimedia device, a portable medical device, a camera, a wearable device, a robot or home appliances, but various embodiments are not limited thereto.

The edge nodes 120 may support the radio communication of the UE 110. For example, any one of the edge nodes 120 may support communication between the UE 110 and an external device. The edge nodes 120 may transmit content to the UE 110 in response to a request from the UE 110. In this case, the edge nodes 120 may be distributed and deployed in an edge cell area 115 defined as the center of the UE 110. The edge cell area 115 may have a predetermined radius "r", and may be defined as an area in which the coverage areas of the edge nodes 120 overlap. For example, the edge node 120 may include a small base station, for example, at least any one of a femto base station or a pico base station.

The edge nodes 120 may store at least some of content frequently requested by the UE 110. In this case, the edge nodes 120 may divide and store at least some of packets split from the content according to a maximum distance separable (MDS) coding scheme. Accordingly, the edge nodes 120 may transmit the stored packets to the UE 110 by cooperating with each other in response to a request from the UE 110. According to the MDS coding scheme, the edge nodes 120 may transmit the stored packets to the UE 110 through cooperation without separate control of the macro BS 130 or another central entity. Accordingly, the UE 110 may restore the content using the packets received from the edge nodes 120. In this case, the UE 110 may restore the content according to the MDS coding scheme.

The macro BS 130 may support the radio communication of the UE 110. In this case, the macro BS 130 may support the radio communication of the UE 110 in association with the edge nodes 120. The macro BS 130 may transmit content to the UE 110 in response to a request from the UE 110. When the request of the UE 110 is received from any one of the edge nodes 120, the macro BS 130 may transmit the content to the UE 110 based on backhaul. In this case, the macro BS 130 may obtain the content from the database 150 over a core network 140. For example, the database 150 stores a plurality of pieces of content, for example, F pieces of content.

If the edge nodes 120 store some of the packets of the content, the macro BS 130 may transmit the remainder of the packets to the UE 110 based on backhaul. For example, the macro BS 130 may transmit the remainder of the packets to the UE 110 through at least one of the edge nodes 120. Accordingly, the UE 110 may restore the content from the packets received from the edge nodes 120 and the macro BS 130. In this case, the UE 110 may restore the content according to the MDS coding scheme.

Figure 2:
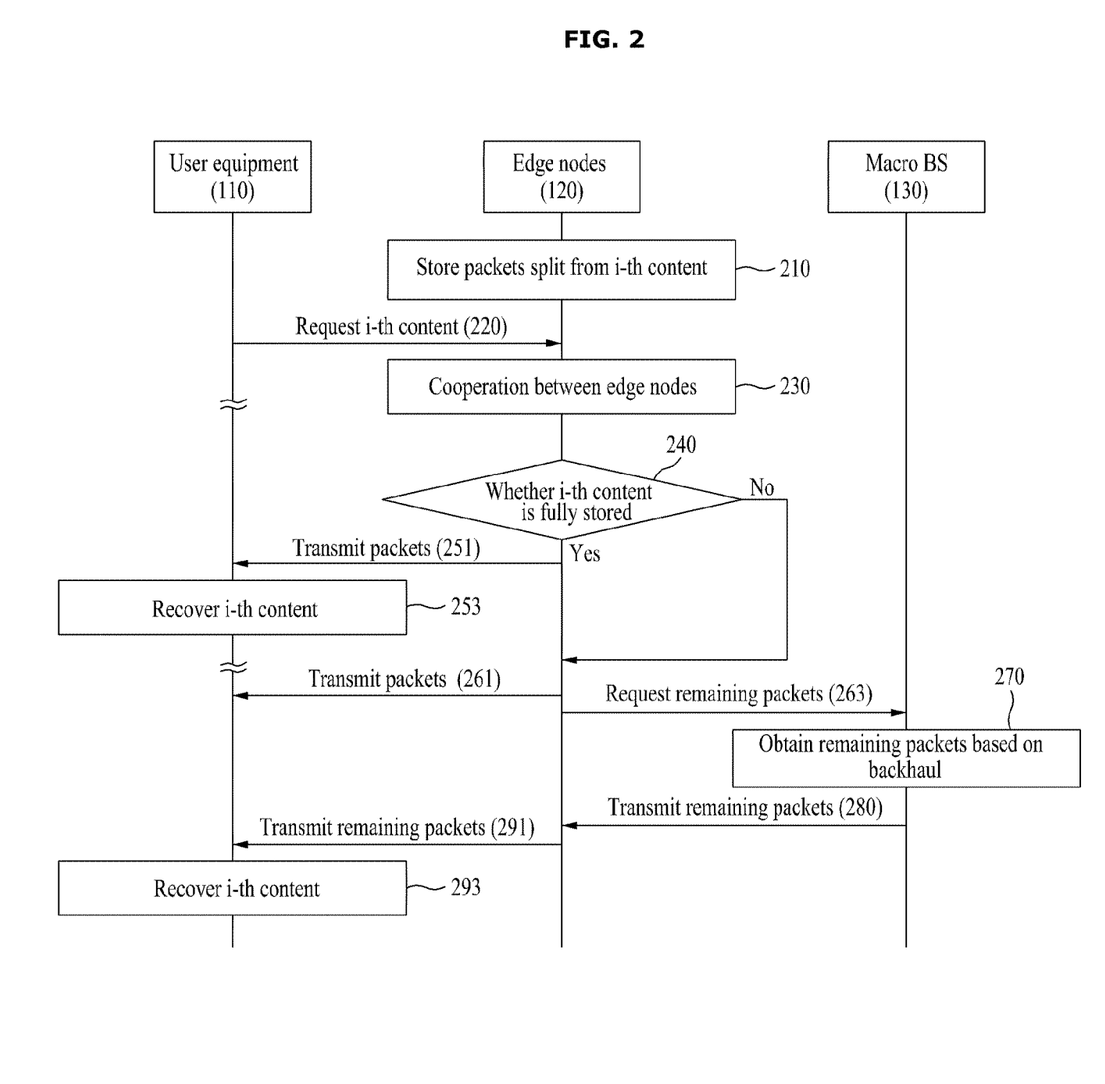
FIG. 2 is a diagram illustrating an operation of a communication system according to various embodiments.

FIG. 2 is a diagram illustrating an operation of the communication system 100 according to various embodiments.

Referring to FIG. 2, at operation 210, the edge nodes 120 may divide and store at least some of packets split from i-th content. In this case, the i-th content may be split into the packets according to the MDS coding scheme. Thereafter, at operation 220, the UE 110 may request the i-th content from the edge nodes 120. For example, any one of the edge nodes 120 may receive the request of the UE 110, and may share the request of the UE 110 with the remaining edge nodes 120. Accordingly, at operation 230, the edge nodes 120 may cooperate with each other. In this case, the edge nodes 120 may check the stored packets. Furthermore, at operation 240, the edge nodes 120 may determine whether they store all the packets of the i-th content.

If it is determined at operation 240 that the edge nodes 120 store all the packets of the i-th content, at operation 251, the edge nodes 120 may transmit the stored packets to the UE 110. Accordingly, at operation 253, the UE 110 may restore the i-th content based on the packets received from the edge nodes 120. In this case, the UE 110 may restore the content according to the MDS coding scheme.

If it is determined at operation 240 that the edge nodes 120 store some of the packets of the i-th content, at operation 261, the edge nodes 120 may transmit the stored packets to the UE 110. Furthermore, at operation 263, the edge nodes 120 may request the remainder of the packets of the i-th content from the macro BS 130. In response to the request, at operation 270, the macro BS 130 may obtain the remainder of the packets of the i-th content based on backhaul. Furthermore, at operation 280, the macro BS 130 may transmit the remainder of the packets of the i-th content to at least one of the edge nodes 120. Accordingly, at operation 291, at least one of the edge nodes 120 may transmit the remainder of the packets of the i-th content to the UE 110. Accordingly, at operation 293, the UE 110 may restore the i-th content is based on the packets received from the edge nodes 120. In this case, the UE 110 may restore the content according to the MDS coding scheme.

According to various embodiments, the index set of pieces of content which may be requested by the UE 110 may be represented as $\Xi=\{1, 2, \ldots, F\}$. In this case, it may be assumed that although request probabilities for pieces of content are determined in descending power, they follow a Zipf distribution without losing generality. That is, assuming that a request probability for an i-th content is $f_i$, it is represented as $f_1 > f_2 > \ldots f_F$, and may be represented as $$f_i = \frac{1/i^r}{\sum_{j=1}^{F} 1/j^r}.$$

Furthermore, it may be assumed that the size of each of pieces of content has a unit size of 1. Furthermore, it may be assumed that the edge nodes 120 follow a Poisson point process corresponding to density $\lambda$ per unit area in a two-dimensional environment.

If four edge nodes 120 are deployed within the edge cell area 115, the i-th content is configured with four ($N_i=4$) MDS-coded packets (i.e., the size of each packet is ¼), and only three of the edge nodes 120 within the edge cell area 115 cache the i-th content, a maximum amount of transmission by which the edge nodes 120 can transmit content to the UE 110 through cooperation may be ¾(=¼*3) of the i-th content. For this reason, the macro BS 130 needs to transmit content corresponding to the remaining ¼(=1−¾) of the i-th content based on backhaul. Accordingly, the UE 110 can restore the i-th content. The reason why the term "maximum amount of transmission" is used is that when fading having a small volume, such as channel fading, or fading having a great volume, such as a path loss according to the distance, are taken into consideration, the UE 110 may not receive ¾ of the i-th content from the edge nodes 120 through only one transmission.

Accordingly, in various embodiments, a method of splitting and storing content in the edge nodes 120 based on MDS coding, which can minimize the amount of backhaul traffic while taking into consideration the possibility that the edge nodes 120 having limited memories may fail in the transmission of content requested by the UE 110 due to fading when they transmitting the content may be derived through a probability geometry model. In this case, assuming that the probability that the i-th content will be stored is $P_i$ and the i-th content is split into $N_i$ packets, the size of each of the packets stored in the edge nodes 120 may be $1/N_i$, and an average amount of storage of the i-th content in the edge nodes 120 may be represented as $$\frac{p_i}{N_i}.$$

In this case, if the memory capacity of each of the edge nodes 120 is defined as T, a memory restriction condition related to the average amount of storage may be represented like $$\frac{p_1}{N_1} + \frac{p_2}{N_2} + \frac{p_3}{N_3} + \ldots + \frac{p_F}{N_F} \leq T.$$

If at least $N_i$ edge nodes 120 are present within the edge cell area 115, the UE 110 can successfully restore the i-th content. Accordingly, if the number of edge nodes 120 in which the i-th content is substantially stored within the edge cell area 115 is j (indicated as $|\Phi_i[\mathcal{D}(0,r)]|=j$), only min(j, $N_i$) edge nodes 120 having a high signal to interference ratio (SIR) may participate in transmission. As a result, a maximum amount of transmission which may be simultaneously achieved by the min(j,$N_i$) edge nodes 120 having a high SIR value may be said to be a symmetric multi-access channel (MAC) rate. Whether a packet has been successfully transmitted may be determined based on the symmetric MAC rate. Accordingly, a symmetric MAC rate formed by the MAC channels of the min(j,$N_i$) edge nodes 120 that belong to the j edge nodes 120 and that actually participate in transmission may be represented as $C_{sym}(\mathcal{A}_{SIR}^{(j,\min(j,N_i))})$.

Assuming that a data rate necessary to successfully transmit i-th content having a unit size (=1) is τ, a data rate necessary for the successful transmission of each of packets split from the i-th content packets may be τ/$N_i$. In such a transmission environment, the amount of information which may be obtained with respect to the i-th content may be summarized into three cases as represented in Equation 1. That is, when the symmetric MAC rate formed by the min(j,$N_i$) edge nodes 120 that have a high SIR value and that participate in transmission is smaller than τ/$N_i$, that is, a target data rate, the amount of information for the i-th content which may be received by the UE 110 may be 0. In contrast, that is, when the symmetric MAC rate is greater than τ/$N_i$, that is, a target data rate, the amount of information for the i-th content which may be received by the UE 110 may be min(j,$N_i$)/$N_i$.

$$
\begin{aligned}
&1)\ \mathcal{I}_i = 0 \text{ if } C_{sym}(\mathcal{A}_{SIR}^{(j,\min(j,N_i))}) < \frac{\tau}{N_i} \\
&2)\ \mathcal{I}_i = \frac{j}{N_i} \text{ if } C_{sym}(\mathcal{A}_{SIR}^{(j,\min(j,N_i))}) \geq \frac{\tau}{N_i} \text{ when } j < N_i \\
&3)\ \mathcal{I}_i = 1 \text{ if } C_{sym}(\mathcal{A}_{SIR}^{(j,\min(j,N_i))}) \geq \frac{\tau}{N_i} \text{ when } j \geq N_i
\end{aligned} \qquad (1)
$$

If all the three cases in Equation 1 are taken into consideration, an average amount of information by which the UE 110 may receive content from the edge nodes 120 with respect to the i-th content may be represented as Q(i) like Equation 2.

$$
Q(i) = \sum_{j=1}^{\infty} \left( \frac{j}{N_i} \cdot \mathcal{A}_{j,N_i} + 1 \cdot \mathcal{S}_{j,N_i} \right) Pr[|\Phi_i[\mathcal{D}(0,r)]| = j] \qquad (1)
$$

where $$
\mathcal{A}_{j,N_i} = Pr\left[ C_{sym}(\mathcal{A}_{SIR}^{(j,\min(j,N_i))}) \geq \frac{\tau}{N_i}, \min(j, N_i) = j \right], \qquad (2)
$$

$$
\mathcal{S}_{j,N_i} = Pr\left[ C_{sym}(\mathcal{A}_{SIR}^{(j,\min(j,N_i))}) \geq \frac{\tau}{N_i}, \min(j, N_i) = N_i \right].
$$

In Equation 2, $Pr[|\Phi_i[\mathcal{D}(0,r)]|=j]$ means the probability that the number of edge nodes 120 in which the i-th content is stored within the radius "r" of the edge cell area 115 will be j. Such a distribution may follow the aforementioned Poisson distribution.

Accordingly, an optimum method of splitting and storing content based on MDS coding, which can minimize average backhaul traffic (=maximize an average amount of information by which content may be received from the edge node 120) while satisfying the memory restriction condition, may be deployed through an optimization problem P1, such as Equation 3.

$$
P1: \max_{\substack{N_1,N_2,\ldots,N_F \\ p_1,p_2,\ldots,p_F}} \sum_{i=1}^{F} f_i \times Q(i) \qquad (3)
$$

subject to $\frac{p_1}{N_1} + \frac{p_2}{N_2} + \cdots + \frac{p_F}{N_F} \leq T$, $0 \leq p_i \leq 1$, for $i \in \{1, 2, \ldots, F\}$ $N_i \in \mathbb{N}$. for $i \in \{1, 2, \ldots, F\}$ It may be assumed that an average amount of storage is given like $$
s_i = \frac{1/i^r}{\sum_{j=1}^{F} 1/j^r} T
$$

with respect to the i-th content because an approach to the optimization problem P1 of Equation 3 to be solved is not easy. This may be a quite rational assumption because an average amount of storage of each edge node 120 for corresponding content needs to be increased as content has a high request probability in order to increase a content transmission probability through surrounding edge nodes 120. Accordingly, if the optimization problem P1 may be changed into a problem related to one piece of content and the radius "r" of the edge cell area 115 is defined $$
\left( Pr\left[ C_{sym}(\mathcal{A}_{SIR}^{(j,\min(j,N_i))}) \geq \frac{\tau}{N_i} \right] = 1 \right),
$$

the optimization problem P1 in Equation 3 may be transformed like Equation 4.

$$
\min_{N_i} \sum_{j=0}^{N_i - 1} \left( 1 - \frac{j}{N_i} \right) \times \frac{(M_i N_i)^j}{j!} \exp(-M_i N_i), \qquad (4)
$$

subject to $\frac{p_i}{N_i} = s_i$, $0 \leq p_i \leq 1$, for $i \in \{1, 2, \ldots, F\}$ $N_i \in \mathbb{N}$, for $i \in \{1, 2, \ldots, F\}$ In this case, $$
M_i = \lambda \pi r^2 \frac{p_i}{N_i}
$$

may indicate an average amount of storage for the i-th content within the edge cell area 115. Assuming that an objective function of the problem transformed like Equation 4 is g($N_i$=C) and a difference of g($N_i$) when $N_i$=C and when $N_i$=C+1 is h(C) (h(C)=g(C+1)−g(C)), it may be seen that h(C) is smaller than 0 with respect to all integers C when 0<$M_i$≤2 in the three environments like Equation 5 and Equation 6. First, the case 0<$M_i$≤1, may be verified like Equation 5. Furthermore, the case 1<$M_i$≤2 may be verified using a characteristic in that $t^{c-1}e^{-t}$ has a local maximum in t=$M_i$C like Equation 6.

1) $M_i C \leq M_i(C+1) \leq C-1$ $$h(C) \overset{(a)}{\leq} \frac{(M_i C)^{C-1}}{\Gamma(C)} e^{-M_i C}(-M_i - (1-M_i)M_i) + \frac{(M_i(C+1))^C}{\Gamma(C+1)} e^{-M_i(C+1)} =$$

$$\frac{M_i^C e^{-M_i(C+1)}}{\Gamma(C+1)} (C^C e^{M_i}(M_i - 2) - (C+1)^C) < 0$$

(a) is established because the function $t^{c-1}e^{-t}$ has a local minimum in $t=M_i C$ 2) $C-1 \leq M_i C \leq M_i(C+1)$ $$h(C) \overset{(b)}{\leq} -M_i \frac{(M_i C)^{C-1}}{\Gamma(C)} e^{-M_i C} +$$

$$\frac{(M_i(C+1))^{C-1} e^{-M_i(C+1)}}{\Gamma(C)} \left( \frac{M_i(C+1)}{C} - (1-M_i)M_i \right) =$$

$$\frac{M_i^C e^{-M_i(C+1)}}{\Gamma(C+1)} (-C^C e^{M_i} + (C+1)^{C-1}(1+M_i C)) < 0$$

(b) is established because the function $t^{c-1}e^{-t}$ has a local minimum in $t=M_i(C+1)$ $$M_i C \leq C-1 \leq M_i(C+1) \quad (3)$$

This case corresponds to the case 1) or 2) because $t^{c-1}e^{-t}$ has a local minimum in $$t = M_i C \text{ or } t = M_i = (C+1) \quad (5)$$

$$h(C) \leq \frac{M_i^C e^{-M_i(C+1)}}{\Gamma(C+1)} (C^C e^{M_i}(M_i - 2) - (C+1)^C) < 0 \quad (6)$$

Accordingly, when the range of an average amount of storage for the i-th content within the edge cell area 115 is $0<M_i \leq 2$, a method of splitting content as much as possible and transmitting the content $$\left( N_i = \left\lfloor \frac{\lambda \pi r^2}{M_i} \right\rfloor \right)$$

can minimize an average backhaul usage capacity. However, a normal approximation is possible for a range having a great average amount of storage for an I-th file like $M_i > 2$. In this case, an approximated value may be represented like Equation 7.

$$g(C) \approx Pr\left( \frac{C-1-M_i C}{\sqrt{M_i C}} \leq Z \leq \frac{C-M_i C}{\sqrt{M_i C}} \right) - \quad (7)$$

$$M_i Pr\left( -\sqrt{M_i C} \leq Z \leq \frac{(C-1)-M_i C}{\sqrt{M_i C}} \right)$$

In this case, the minus term of approximated g(C) approaches 0 with respect to the range $$C \geq \frac{6.25 M_i}{(M_i - 1)^2}.$$

Accordingly, the g(C) value may be approximated again like Equation 8.

$$g(C) \approx Pr\left( \frac{C-1-M_i C}{\sqrt{M_i C}} \leq Z \leq \frac{C-M_i C}{\sqrt{M_i C}} \right) \quad (8)$$

In the range $$C \geq \frac{6.25 M_i}{(M_i - 1)^2},$$

it is evident that the approximated g(C) value is a decreasing function for C. Accordingly, an optimum MDS coding-based content split number that minimizes an average amount of backhaul traffic may be determined among $$\left\{ 1, 2, \ldots, \frac{6.25 M_i}{(M_i - 1)^2}, \left\lfloor \frac{\lambda \pi r^2}{M_i} \right\rfloor \right\}.$$

Accordingly, if $0<M_i \leq 2$ and all $M_i$ values cover the $M_i > 2$ condition, an optimum number of content splits may be summarized like Equation 9.

Theorem 1. For file $i$, if $0 < M_i \leq 2$, the best solution is $N_i^* =$ (9)

$$\left\lfloor \frac{\lambda \pi r^2}{M_i} \right\rfloor \text{ and correspondingly } p_i^* = s_i N_i^*. \text{ If } M_i > 2,$$

the best value of $N_i^*$ is among $\left\{ 1, 2, \ldots, \frac{6.25 M_i}{(M_i - 1)^2}, \left\lfloor \frac{\lambda \pi r^2}{M_i} \right\rfloor \right\}.$ The optimization problem P1 is to be solved using a symmetric rate of a frequency-based orthogonal multi-access method having the same size as the lower bound of a symmetric multi-access channel (MAC) rate. If an orthogonal multi-access method is used within the edge cell area 115, an inequation, such as Equation 10, may be established. Accordingly, with respect to the objective function of the optimization problem P1, a lower bound may be established like Equation 11.

$$Pr\left[ C_{sym}\left( \mathcal{A}_{SIR}^{(j, \min(j, N_i))} \right) \geq \frac{\tau}{N_i} \right] \geq \quad (10)$$

$$Pr\left[ \frac{1}{\min(j, N_i)} \log_2(1 + \min(j, N_i) SIR_{\min(j, N_i)}) \geq \frac{\tau}{N_i} \right]$$

-continued $$\sum_{j=1}^{\infty} \left(\frac{j}{N_i} \cdot \mathcal{A}_{j,N_i} + 1 \cdot \mathcal{S}_{j,N_i}\right) Pr[|\Phi_i[\mathcal{D}(0,r)]| = j] \geq \quad (6)(11)$$

$$\left(\sum_{j=1}^{N_i-1} \frac{j}{N_i} \cdot Pr\left[\frac{1}{j}\log_2(1+jSIR_j) \geq \frac{\tau}{N_i}\right] + \right.$$

$$\left. \sum_{j=N_i}^{\infty} 1 \cdot Pr\left[\frac{1}{N_i}\log_2(1+N_iSIR_{N_i}) \geq \frac{\tau}{N_i}\right]\right)$$

$$Pr[|\Phi_i[\mathcal{D}(0,r)]| = j] = \left(\sum_{j=1}^{N_i-1} \frac{j}{N_i} Pr\left[SIR^{SU} \geq \frac{2^{\frac{\tau j}{N_i}}-1}{j}\right]^j + \right.$$

$$\sum_{j=N_i}^{\infty} \sum_{k=N_i}^{j} \binom{j}{k} Pr\left[SIR^{SU} \geq \frac{2^{\tau}-1}{N_i}\right]^k$$

$$\left. \left(1 - Pr\left[SIR^{SU} \geq \frac{2^{\tau}-1}{N_i}\right]\right)^{j-k}\right) Pr[|\Phi_i[\mathcal{D}(0,r)]| = j].$$

In Equations 10 and 11, the $SIR^{SU}$ value indicates an SIR from the edge nodes 120, equally distributed within the edge cell area 115, to the UE 110. $Pr[SIR^{SU} \geq \xi]$ may be obtained like Equation 12.

$$Pr[SIR^{SU} \geq \xi] = \int_0^r Pr\left[\frac{H_s x^{-\alpha}}{\sum_{k \in \Phi_i \setminus \mathcal{D}(0,r)} G_k |X_k|^{-\alpha}} \geq \xi\right] Pr[|Xs| = x] dx \quad (12)$$

$$= \int_0^r \mathbb{E}\left[\exp\left(-\xi x^{\alpha} \sum_{k \in \Phi_i \setminus \mathcal{D}(0,r)} G_k |X_k|^{-\alpha}\right)\right] \frac{2x}{r^2} dx$$

$$= \int_0^r \mathbb{E}\left[\prod_{k \in \Phi_i \setminus \mathcal{D}(0,r)} \exp(-\xi x^{\alpha} G_k |X_k|^{-\alpha})\right] \frac{2x}{r^2} dx$$

$$= \int_0^r \exp\left(-2\pi\lambda \int_r^{\infty} \frac{\xi x^{\alpha} e^{-\alpha+1}}{1+\xi x^{\alpha} r^{-\alpha}} dr\right) \frac{2x}{r^2} dx$$

$$= \int_0^r \exp\left(-2\pi\lambda \left(\frac{1}{\xi x^{\alpha}}\right)^{-2/\alpha} \cdot \frac{\pi}{\alpha} \csc\left(\frac{2\pi}{\alpha}\right) + \pi\lambda r_2^2 F_1\left(1, \frac{2}{\alpha}; \frac{\alpha+2}{\alpha}; -\frac{r^{\alpha}}{\xi x^{\alpha}}\right)\right) \frac{2x}{r^2} dx$$

In Equation 12, D(0,r) indicates the circle of the radius "r" around the UE 110. $H_s$ and $G_k$ may indicate interference channel gains of a base station, which generate interference with respect to the edge node 120 and the UE 110, respectively. $X_s$ and $X_k$ may indicate the distance between an interference base station and each of the edge nodes 120.

As a result, if the orthogonal multi-access method is used, an optimization problem P2, such as Equation 13, may be derived from Equation 11.

$$P2: \max_{N_i} \quad (6)$$

$$\text{subject to } \frac{p_i}{N_i} = s_i, \quad (13)$$

$$0 \leq p_i \leq 1, \text{ for } i \in \{1, 2, \ldots, F\},$$

$$N_i \in \mathbb{N}. \text{ for } i \in \{1, 2, \ldots, F\}.$$

An optimal solution may be obtained through finite integer range search of $$N_i \in \left\{1, 2, \ldots, \left\lfloor \frac{\lambda \pi r^2}{M_i} \right\rfloor\right\}$$

through the optimization problem P2.

Figure 3:
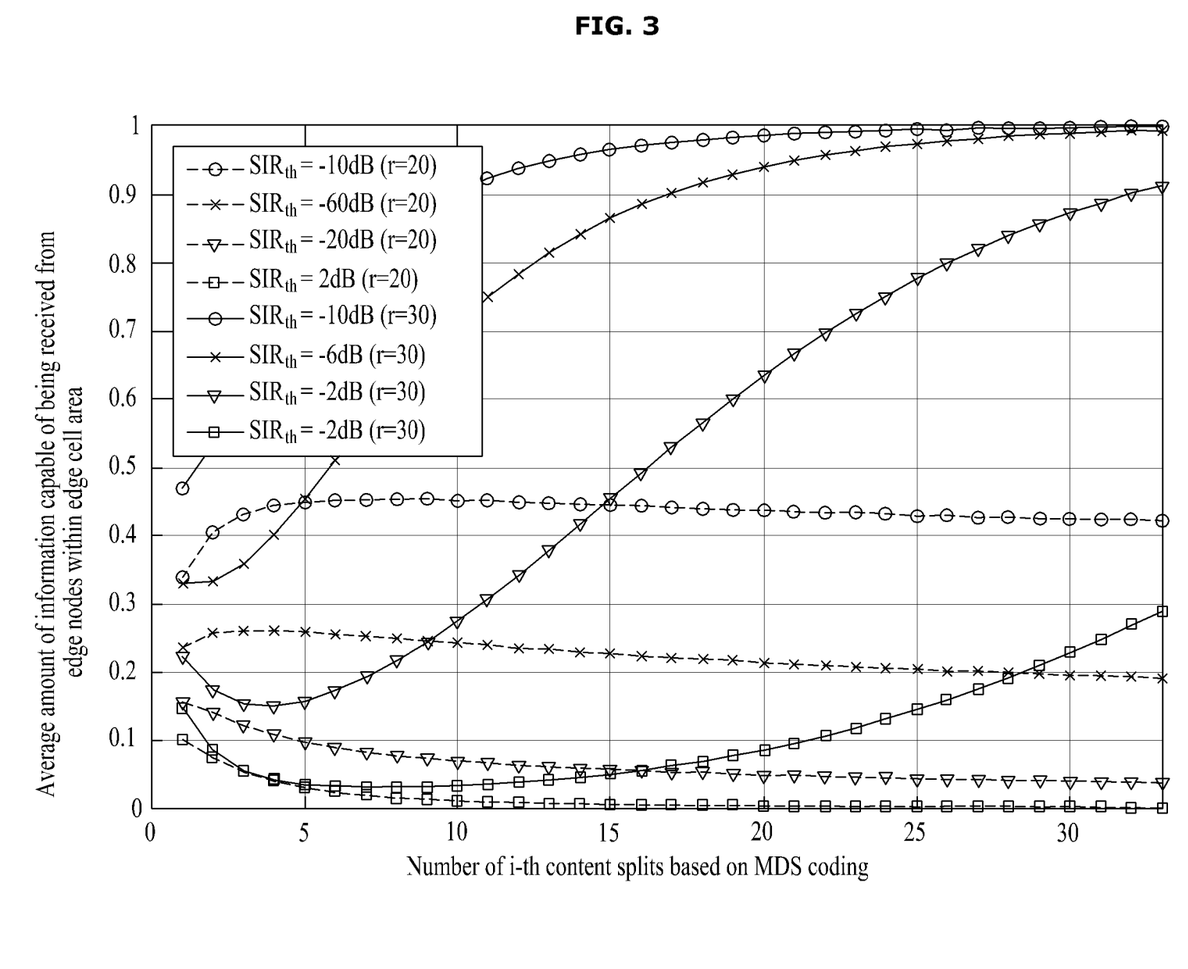
FIG. 3 is a diagram for describing the characteristics of a communication system according to various embodiments.

FIG. 3 is a diagram for describing the characteristics of the communication system 100 according to various embodiments. FIG. 3 may illustrate an average amount of information by which the UE 110 may received information from surrounding edge nodes 120 with respect to an i-th content split number according to a target data rate (=SIR threshold) τ. In detailed simulation environments, an average amount of storage of the i-th content may be $s_i$=0.03, and average density of the edge node 120 per unit area may be $$\lambda - 0.02\left(\frac{\text{units}}{\text{m}^2}\right).$$

Referring to FIG. 3, backhaul usage for restoring content may be less required as the UE 110 receives a maximum amount of information from surrounding edge nodes 120. When r=30, an optimum number of content splits is $$N_i = \left\lfloor \frac{\lambda \pi r^2}{M_i} \right\rfloor = 33,$$

that is, the number by which content can be split as much as possible, in SIR thresholds −10 dB, −6 dB, −2 dB, and 2 dB. When r=20, an optimum number of content splits is $$N_i = \left\lfloor \frac{\lambda \pi r^2}{M_i} \right\rfloor = 33$$

in SIR thresholds −10 dB, −6 dB, and −2 dB, but an optimum number of content splits is $N_i$=1 in SIR threshold 2 dB. In this case, the number of content splits may be optimal in the case of non-split storage.

According to various embodiments, if successful transmission is guaranteed within the edge cell area 115, when a content request probability value was small (0<$M_i$≤2), an optimum solution was found in a closed form. In contrast, when the content request probability value is great ($M_i$>2), an optimum number of content splits could be found using a finite integer search method of reducing search complexity. It could be seen that although a common channel environment was taken into consideration, a desired optimal solution could be found through the finite integer search and the optimal solution could be different depending on an SIR threshold.

Figure 4:
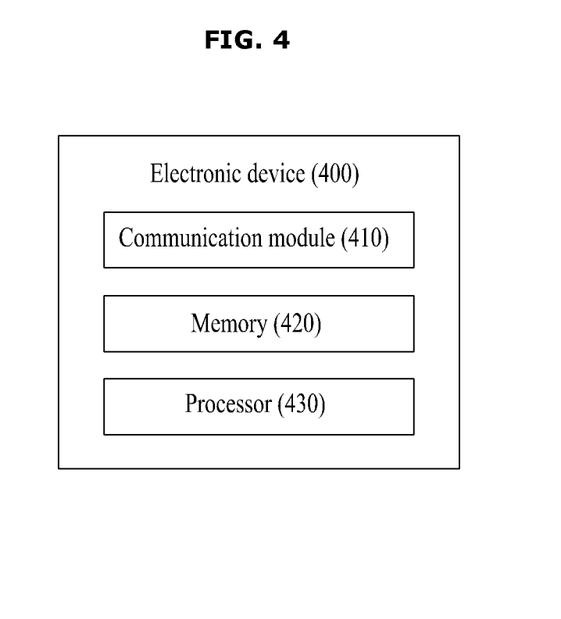
FIG. 4 is a diagram illustrating an electronic device according to various embodiments.

FIG. 4 is a diagram illustrating an electronic device 400 according to various embodiments.

Referring to FIG. 4, the electronic device 400 according to various embodiments may include at least any one of a communication module 410, a memory 420 or a processor 430. In an embodiment, at least any one of the elements of the electronic device 400 may be omitted or one or more other elements may be added to the electronic device 400. According to one embodiment, the electronic device 400 may be implemented in at least one of the edge nodes 120.

According to another embodiment, the electronic device 400 may be implemented in the macro BS 130.

The communication module 410 may support the execution of communication by the electronic device 400. The communication module 410 may establish a communication channel for the electronic device 400, and may perform communication through the communication channel.

The memory 420 may store various data used by at least one of the elements of the electronic device 400. The data may include input data or output data for a program or instructions related to the program. For example, the memory 420 may include at least any one of a volatile memory or a non-volatile memory.

The processor 430 may control an element of the electronic device 400 by executing a program of the memory 420, and may perform data processing or an operation. The processor 430 may detect optimum number of content splits for splitting i-th content. In this case, the processor 430 may detect the optimum number of content splits based on an average amount of storage of the edge nodes 120 for the i-th content or the radius "r" of the edge cell area 115 in which the coverage areas of the edge nodes 120 overlap. For example, the optimum number of content splits may be detected as any one of $$\left\{1, 2, \cdots, \frac{6.25 M_i}{(M_i - 1)^2}, \left\lfloor \frac{\lambda \pi r^2}{M_i} \right\rfloor\right\}.$$

In this case, $M_i$ may indicate the average amount of storage, and $\lambda$ may indicate average density of the edge nodes 120 per unit area. For example, when the average amount of storage is more than 0 and is 2 or less, the optimum number of content splits may be detected as $$\left\lfloor \frac{\lambda \pi r^2}{M_i} \right\rfloor.$$

For another example, when the average amount of storage is more than 2, the optimum number of content splits may be detected as one of $$\left\{1, 2, \cdots, \frac{6.25 M_i}{(M_i - 1)^2}, \left\lfloor \frac{\lambda \pi r^2}{M_i} \right\rfloor\right\}.$$

Accordingly, the processor 430 may detect the optimum number of content splits so that the average amount of information by which the UE 110 may receive content from the edge nodes 120 approaches a predetermined maximum value. According to one embodiment, the number may be differently detected based on an SIR from the edge nodes 120 to the UE 110. The processor 430 may allow a plurality of the edge nodes 120 to split and store at least some of packets split from the i-th content based on the optimum number of content splits.

Accordingly, the edge nodes 120 may transmit the stored packets to the UE 110 within the edge cell area 115 in response to a request from the UE 110. Furthermore, the UE 110 may receive the stored packets from the edge nodes 120. According to one embodiment, if the edge nodes 120 store some of the packets of the i-th content, the UE 110 may further receive the remainder of the packets from the macro BS 130. Accordingly, the UE 110 may restore the i-th content from the received packets.

Figure 5:
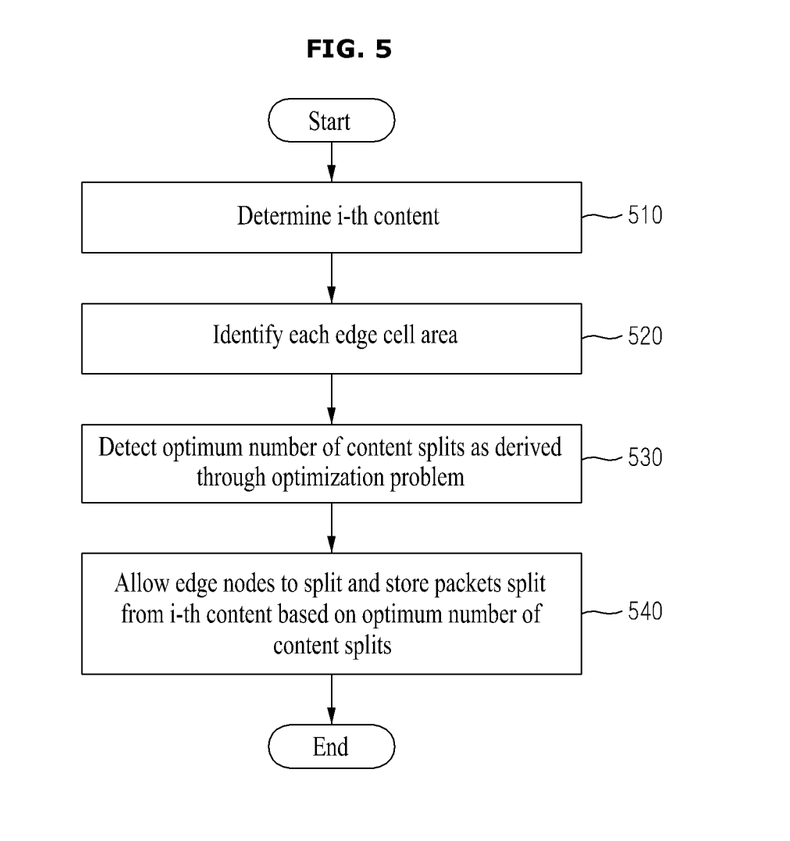
FIG. 5 is a diagram illustrating an operation of an electronic device according to various embodiments.

FIG. 5 is a diagram illustrating an operation of the electronic device 400 according to various embodiments.

Referring to FIG. 5, at operation 510, the electronic device 400 may determine i-th content to be stored in the edge nodes 120. Furthermore, at operation 520, the electronic device 400 may identify each edge cell area 115. In this case, the edge cell area 115 may have a predetermined radius "r", and may be defined as an area in which the coverage areas of the edge nodes 120 overlap.

At operation 530, the electronic device 400 may detect an optimum number of content splits as derived through the aforementioned optimization problem. In this case, the processor 430 may detect the optimum number of content splits based on an average amount of storage of the edge nodes 120 for the i-th content or the radius "r" of the edge cell area 115 in which the coverage areas of the edge nodes 120 overlap. For example, the optimum number of content splits may be detected as any one of $$\left\{1, 2, \cdots, \frac{6.25 M_i}{(M_i - 1)^2}, \left\lfloor \frac{\lambda \pi r^2}{M_i} \right\rfloor\right\}.$$

In this case, $M_i$ may indicate the average amount of storage, and $\lambda$ may indicate average density of the edge nodes 120 per unit area. For example, when the average amount of storage is more than 0 and is 2 or less, the optimum number of content splits may be detected as $$\left\lfloor \frac{\lambda \pi r^2}{M_i} \right\rfloor.$$

For another example, when the average amount of storage is more than 2, the optimum number of content splits may be detected as one of $$\left\{1, 2, \cdots, \frac{6.25 M_i}{(M_i - 1)^2}, \left\lfloor \frac{\lambda \pi r^2}{M_i} \right\rfloor\right\}.$$

Accordingly, the processor 430 may detect the optimum number of content splits so that the average amount of information by which the UE 110 may receive content from the edge nodes 120 approaches a predetermined maximum value. According to one embodiment, the number may be differently detected based on an SIR from the edge nodes 120 to the UE 110

At operation 540, the electronic device 400 may allow the edge nodes 120 to split and store packets split from the i-th content based on the optimum number of content splits.

Accordingly, the edge nodes 120 may transmit the stored packets to the UE 110 within the edge cell area 115 in response to a request from the UE 110. Furthermore, the UE 110 may receive the stored packets from the edge nodes 120. According to one embodiment, if the edge nodes 120 store some of the packets of the i-th content, the UE 110 may further receive the remainder of the packets from the macro BS 130. Accordingly, the UE 110 may restore the i-th content from the received packets.

According to various embodiments, backhaul traffic can be minimized because the electronic device 400 detects an optimum number of content splits and packets split from content are stored in the edge nodes 120 based on the optimum number of content splits. Furthermore, since backhaul traffic is minimized, a latency time felt by the user of the UE 110 can be minimized. Accordingly, according to the MDS coding scheme, efficiency can be improved when the edge nodes 120 store packets split from content and the UE 110 restore the content from the packets.

The embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

Various embodiments of this document may be implemented in the form of software including one or more instructions stored in a storage medium (e.g., the memory 420) readable by a machine (e.g., the electronic device 400). For example, the processor (e.g., the processor 430) of the machine may fetch at least one of one or more stored instructions from a storage medium, and may execute the one or more instructions. This enables the machine to perform at least one function based on the fetched at least one instruction. The one or more instructions may include code generated by a complier or code executable by an interpreter. The storage medium readable by the machine may be provided in the form of a non-transitory storage medium. In this case, "non-transitory" means that a storage medium is a tangible device and does not include a signal (e.g., electromagnetic waves). The term is not used regardless of whether data is semi-persistently stored in a storage medium and whether data is temporally stored in a storage medium.

According to various embodiments, each (e.g., module or program) of the described elements may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into one element. In such a case, the integrated elements may perform one or more functions of each of a plurality of elements identically with or similar to that performed by a corresponding one of the plurality of elements before the elements are integrated. According to various embodiments, module, operations performed by a program or other elements may be executed sequentially, in parallel, repeatedly, or heuristically, or one or more of the operations may be executed in different order or may be omitted, or one or more other operations may be added.

According to various embodiments, backhaul traffic can be minimized because the electronic device detects an optimum number of content splits and packets split from content are stored in edge nodes based on the optimum number of content splits. Furthermore, since backhaul traffic is minimized, a latency time felt by the user of a UE can be minimized. Accordingly, according to the MDS coding scheme, efficiency can be improved when the edge nodes store packets split from content and the UE restore the content from the packets.

What is claimed is:

1. An operating method of an electronic device, comprising:
    detecting a number for splitting one piece of content; and
    allowing a plurality of edge nodes to split and store at least some of packets split from the content based on the number,
    wherein each of the edge nodes include a femto base station or a pico base station that is different from a user equipment (UE) and a macro base station (BS),
    wherein the detecting of the number is performed based on a radius of an edge cell area in which coverage areas of the edge nodes overlap along with an average amount of storage of the edge nodes for the content,
    wherein the edge nodes store the at least some of packets split from the content according to a maximum distance separable (MDS) coding scheme,
    wherein the edge nodes distributed and deployed in the edge cell area directly transmit the stored packets simultaneously to the UE within the edge cell area in response to a request from the UE by cooperating with each other without separate control of the macro base station (BS), wherein the UE receives the stored packets from the edge nodes and restores the content from the received packets, wherein the UE further receives a remainder of the packets from the BS if the edge nodes store some of the packets,
    wherein the detecting of the number comprises, $$\left\lceil \frac{\lambda \pi r^2}{M_i} \right\rceil$$

in response to when the average amount of storage is more than 0 and less than or equal to 2, and $$\frac{6.25 M_i}{(M_i - 1)^2}$$

in response to when the average amount of storage exceeds 2,
    maintaining the detected number or re-detecting the number as a different value based on a signal to interference ratio (SIR) from the edge nodes to the UE,
    wherein $M_i$ indicates the average amount of storage, r indicates the radius, and $\lambda$ indicates average density of the edge nodes per unit area, wherein the average amount of storage of the edge nodes for the content is based on a probability that the content will be stored over the number of the packets that the content is split into.

2. The operating method of claim 1, wherein the detecting of the number is performed so that an average amount of information by which the UE is capable of receiving content from the edge nodes approaches a predetermined maximum value.

3. The operating method of claim 1, wherein the electronic device is implemented in any one of any one of the edge nodes or the macro base station (BS).

4. An electronic device, comprising:
a communication module;
and a processor connected to the communication module, wherein the processor is configured to:
detect a number for splitting one piece of content, and
allow a plurality of edge nodes to split and store at least some of packets split from the content based on the number,
wherein each of the edge nodes include a femto base station or a pico base station that is different from a user equipment (UE) and a macro base station (BS),
wherein the detecting of the number is performed based on a radius of an edge cell area in which coverage areas of the edge nodes overlap along with an average amount of storage of the edge nodes for the content,
wherein the edge nodes store the at least some of packets split from the content according to a maximum distance separable (MDS) coding scheme,
wherein the edge nodes distributed and deployed in the edge cell area directly transmit the stored packets simultaneously to the UE within the edge cell area in response to a-request from the UE by cooperating with each other without separate control of the macro base station (BS), wherein the UE receives the stored packets from the edge nodes and restores the content from the received packets, wherein the UE further receives a remainder of the packets from the BS if the edge nodes store some of the packets,
wherein the processor is configured to:
detect the number as $$\left\lceil \frac{\lambda \pi r^2}{M_i} \right\rceil$$

in response to when the average amount of storage is more than 0 and less than or equal to 2,
detect the number as $$\frac{6.25 M_i}{(M_i - 1)^2}$$

in response to when the average amount of storage exceeds 2,
maintain the detected number or re-detecting the number as a different value based on a signal to interference ratio (SIR) from the edge nodes to the UE,
wherein $M_i$ indicates the average amount of storage, r indicates the radius, and $\lambda$ indicates average density of the edge nodes per unit area,
wherein the average amount of storage of the edge nodes for the content is based on a probability that the content will be stored over the number of the packets that the content is split into.

5. The electronic device of claim 4, wherein the processor is configured to detect the number so that an average amount of information by which the UE is capable of receiving content from the edge nodes approaches a predetermined maximum value.

6. The electronic device of claim 4, wherein the electronic device is implemented in any one of any one of the edge nodes or the macro base station (BS).

* * * * *